United States Patent
Berikai Vasu et al.

(10) Patent No.: US 12,070,816 B2
(45) Date of Patent: Aug. 27, 2024

(54) WELDING PROCESS

(71) Applicant: TE Connectivity Germany GmbH, Bensheim (DE)

(72) Inventors: Aniruddha Berikai Vasu, Bensheim (DE); Rudi Blumenschein, Bensheim (DE); Andre Martin Dressel, Bensheim (DE); Florian Brabetz, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 245 days.

(21) Appl. No.: 17/031,077

(22) Filed: Sep. 24, 2020

(65) Prior Publication Data

US 2021/0094123 A1 Apr. 1, 2021

(30) Foreign Application Priority Data

Sep. 26, 2019 (DE) .......................... 102019126012.4

(51) Int. Cl.
| | | |
|---|---|---|
| *B23K 26/21* | (2014.01) | |
| *B23K 26/32* | (2014.01) | |
| *H01B 7/00* | (2006.01) | |
| *H01B 7/40* | (2006.01) | |
| *H01R 4/02* | (2006.01) | |
| *B23K 101/32* | (2006.01) | |

(Continued)

(52) U.S. Cl.
CPC .............. *B23K 26/21* (2015.10); *B23K 26/32* (2013.01); *H01B 7/0009* (2013.01); *H01B 7/40* (2013.01); *B23K 2101/32* (2018.08); *B23K 2101/36* (2018.08); *H01M 50/531* (2021.01)

(58) Field of Classification Search
CPC ................ B23K 2101/38; B23K 26/22; H05K 2203/107
See application file for complete search history.

(56) References Cited

U.S. PATENT DOCUMENTS

| | | | | |
|---|---|---|---|---|
| 5,506,062 A | * | 4/1996 | Flammang ............. | B21K 25/00 428/614 |
| 5,676,865 A | * | 10/1997 | Chang .................... | H05K 3/328 219/121.64 |
| 6,344,687 B1 | | 2/2002 | Huang et al. | |

(Continued)

FOREIGN PATENT DOCUMENTS

| | | |
|---|---|---|
| CN | 102149510 A | 8/2011 |
| CN | 106464099 A | 2/2017 |

OTHER PUBLICATIONS

Extended European Search Report, dated Feb. 23, 2021, 6 pages.

(Continued)

*Primary Examiner* — Helena Kosanovic
*Assistant Examiner* — Lawrence H Samuels
(74) *Attorney, Agent, or Firm* — Barley Snyder

(57) ABSTRACT

A process for welding a conductor onto a workpiece includes providing the conductor including a first metal, providing the workpiece including a second metal, removing an insulation of the conductor over a predetermined length, and forming a bead in a stripped region of the conductor. The conductor is held down on the workpiece to produce a mechanical contact in a welding region between the conductor and the workpiece. The welding region is arranged in a region of the bead. The conductor is laser welded to the workpiece in the welding region.

12 Claims, 3 Drawing Sheets

(51) Int. Cl.
*B23K 101/36* (2006.01)
*H01M 50/531* (2021.01)

(56) References Cited

U.S. PATENT DOCUMENTS

| | | | |
|---|---|---|---|
| 7,009,142 B2 * | 3/2006 | Shi ........................ | H05K 3/363 |
| | | | 219/121.85 |
| 8,853,592 B2 | 10/2014 | Straw et al. | |
| 10,312,777 B2 | 6/2019 | Frohlich et al. | |
| 2005/0258153 A1 * | 11/2005 | Shi ........................ | H05K 3/363 |
| | | | 219/121.85 |
| 2012/0236587 A1 * | 9/2012 | Kim ....................... | B23K 26/32 |
| | | | 362/602 |
| 2018/0221989 A1 * | 8/2018 | Matsuoka ............ | B23K 26/082 |
| 2019/0344377 A1 * | 11/2019 | Idota ..................... | H01R 4/023 |

OTHER PUBLICATIONS

Chinese Office Action and English translation thereof, Application No. 202011015460.3, dated Mar. 8, 2022, 19 pages.
Third Office Action from the National Intellectual Property Administration of China dated Jan. 28, 2023, corresponding to Application No. 202011015460.3 with English translation, 15 pages.
Examination Report dated Jul. 12, 2023, corresponding to Application No. 20 198 447.3-1103, 4 pages.

\* cited by examiner

WELDING PROCESS

CROSS-REFERENCE TO RELATED APPLICATION

This application claims the benefit of the filing date under 35 U.S.C. § 119(a)-(d) of German Patent Application No. 102019126012.4, filed on Sep. 26, 2019.

FIELD OF THE INVENTION

The present invention relates to a welding process and, more particularly, to a process of welding a conductor to a workpiece.

BACKGROUND

It is known from the prior art to weld conductors to a workpiece. The conductor may have one or more cores, the one or more cores being enclosed by an insulating material. In order to weld the conductor to a workpiece, the conductor is stripped of its insulation in one region; the insulating material is removed. The stripped region of the conductor is subsequently pressed onto the workpiece, for example by holding-down devices. In the case of a multi-core conductor, a number of conducting regions that are insulated from one another may be arranged in the workpiece. After the pressing down of the conductor onto the workpiece, at least one core of the conductor is in mechanical contact with either the workpiece or at least one conducting region of the workpiece, and can thus be welded to the workpiece by a laser welding process.

Because the conductor is at a distance from the workpiece due to the insulating material, the holding down of the conductor must take place in such a way that the core or the cores of the conductor is/are pressed against the workpiece with a certain expenditure of force. The holding-down devices must be equipped for this and, for this reason, can also only be used in the stripped region of the conductor.

SUMMARY

A process for welding a conductor onto a workpiece includes providing the conductor including a first metal, providing the workpiece including a second metal, removing an insulation of the conductor over a predetermined length, and forming a bead in a stripped region of the conductor. The conductor is held down on the workpiece to produce a mechanical contact in a welding region between the conductor and the workpiece. The welding region is arranged in a region of the bead. The conductor is laser welded to the workpiece in the welding region.

BRIEF DESCRIPTION OF THE DRAWINGS

The invention will now be described by way of example with reference to the accompanying Figures, of which.

DETAILED DESCRIPTION OF THE EMBODIMENT(S)

Features and exemplary embodiments of the present invention are explained in more detail below with reference to the drawings. It is understood that the invention is not restricted by the disclosed exemplary embodiments. Other variations may be derived therefrom and from the description of the invention without departing from the scope of protection of the invention.

Figure 1:
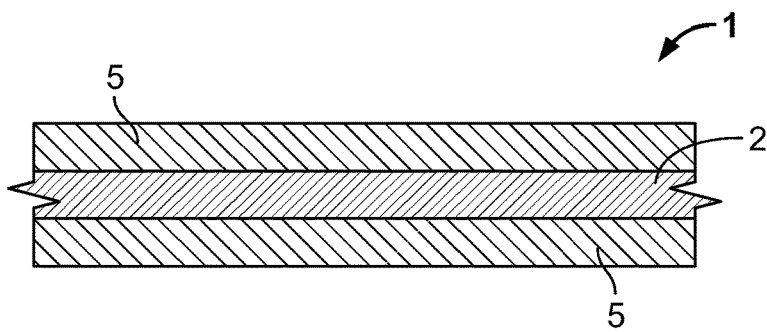
FIG. 1 is a sectional side view of a conductor at a start of a welding process according to an embodiment.

FIG. 1 shows a cross section through a conductor 1 according to an embodiment. The conductor 1 in this case comprises a first metal 2. An insulation 5 has been attached to the first metal 2 of the conductor 1 in such a way that the insulation 5 insulates the first metal 2.

Figure 2:
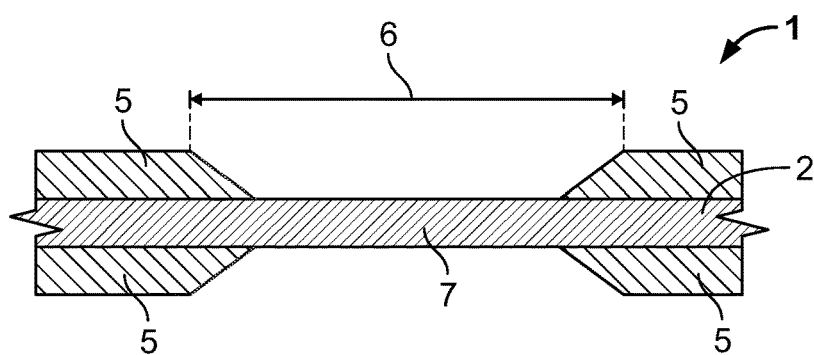
FIG. 2 is a sectional side view of the conductor after stripping of an insulation.

FIG. 2 shows the conductor 1 after the insulation 5 of the conductor 1 has been removed over a predetermined length 6. The removal of the insulation 5 over the predetermined length 6 exposes a part of the first metal 2 of the conductor 1. This exposed region may also be referred to as a stripped region 7.

Figure 3:
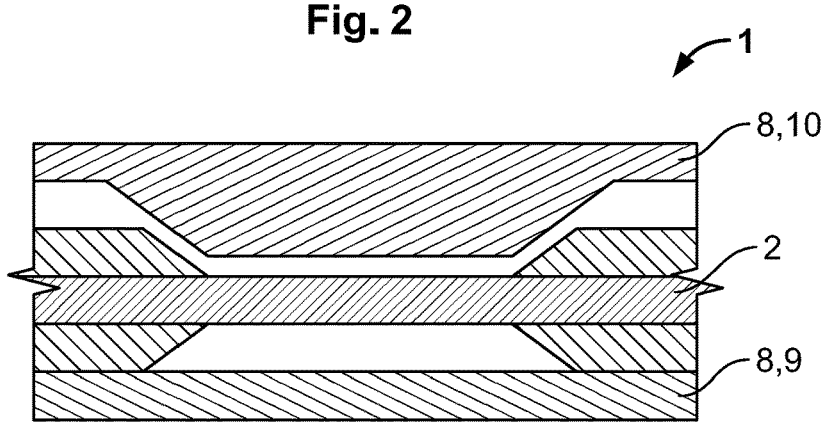
FIG. 3 is a sectional side view of the conductor in a tool.

FIG. 3 shows the conductor 1 from FIGS. 1 and 2 after placing into a molding tool 8. The molding tool 8 in this case includes a lower part 9 and an upper part 10. The molding tool 8 serves the purpose of forming a bead in the stripped region 7 of the conductor 1, by the upper part 10 of the molding tool 8 being moved towards the lower part 9.

Figure 4:
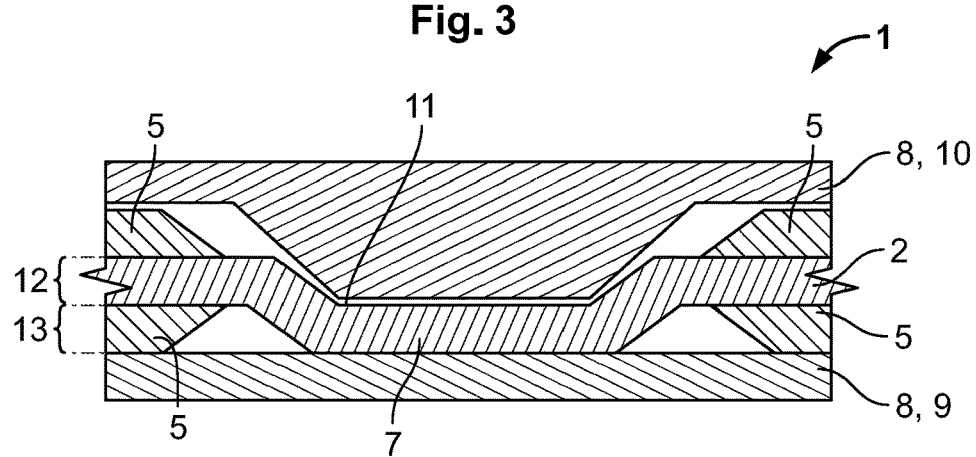
FIG. 4 is a sectional side view of the conductor after forming a bead.

FIG. 4 shows the conductor 1 once the upper part 10 of the molding tool 8 has been moved towards the lower part 9 of the molding tool 8 and a bead 11 has been created in the conductor 1. This takes place, for example, by pressing the upper part 10 onto the lower part 9. In one exemplary embodiment, the forming of the bead 11 takes place by drop forging, the molding tool 8 then being a drop forging tool. On account of the bead 11, the conductor 1 is displaced in its position in the stripped region 7. In this case, a depth 12 of the bead 11 substantially coincides with a thickness 13 of the insulation 5. In alternative embodiments, the depth 12 of the bead 11 does not need to coincide with the thickness 13 of the insulation 5.

Figure 5:
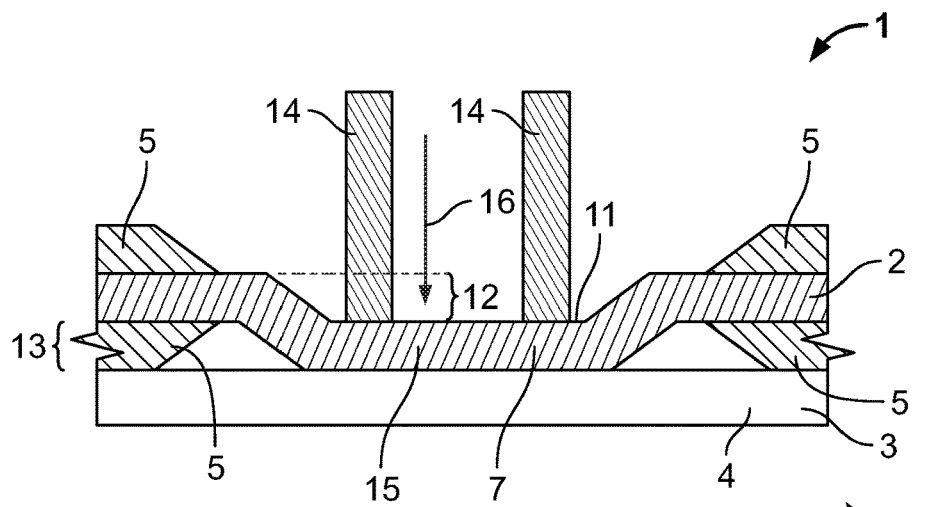
FIG. 5 is a sectional side view of the conductor after holding down and during a welding operation.

FIG. 5 shows the conductor 1 from FIG. 4 after it has been removed from the molding tool 8. The conductor 1 is held down on a workpiece 3 by a plurality of holding-down devices 14. The workpiece 3 in this case is formed of a second metal 4. In a welding region 15, the first metal 2 of the conductor 1 is welded to the second metal 4 of the workpiece 3 by laser radiation 16. Any light source capable of stimulating emission of which the energy and/or power and/or wavelength is suitable for welding together the metals to be welded may be used as the laser in the laser radiation 16.

The bead 11 has the effect that the holding-down devices 14 have to exert a smaller force on the conductor 1 than in the case of the welding processes known from the prior art, because, on account of the bead 11, the first metal 2 of the conductor 1 already lies substantially in contact with the second metal 4 of the workpiece 3, that is to say substantially forms a zero gap. This applies in particular in the welding region 15.

The conductor 1 and the workpiece 3 form an arrangement 21 of a conductor 1 and a workpiece 3, as shown in FIG. 5, the conductor 1 comprising a first metal 2 and the workpiece 3 comprising a second metal 4. In the arrangement 21, the conductor 1 and the workpiece 3 are welded in a welding region 15 and the conductor 1 is stripped of its insulation in the welding region 15 and has a bead 11. In an embodiment, as described in FIG. 4 above, a depth 12 of the bead 11 substantially coincides with a thickness 13 of the insulation 5 outside the stripped region 7 of the conductor 1.

Figure 6:
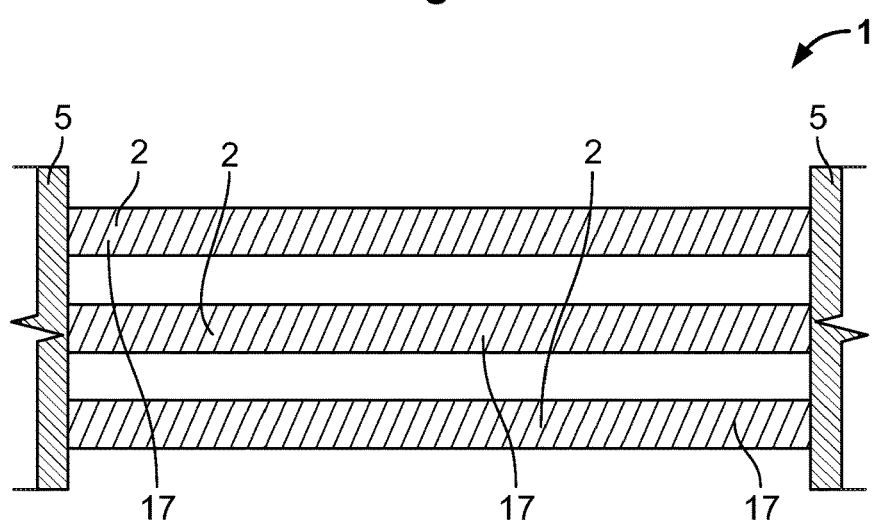
FIG. 6 is a sectional plan view of a stripped multi-core conductor.

FIG. 6 shows a multi-core conductor 1 in a plan view. In the insulation 5, three cores 17 have respectively been stripped, the first metal 2 of the cores 17 being visible on account of the stripping of the cores 17. In cross section, this may correspond to the representation of FIG. 2, the cores 17 being arranged one behind the other and therefore only one being visible.

Figure 7:
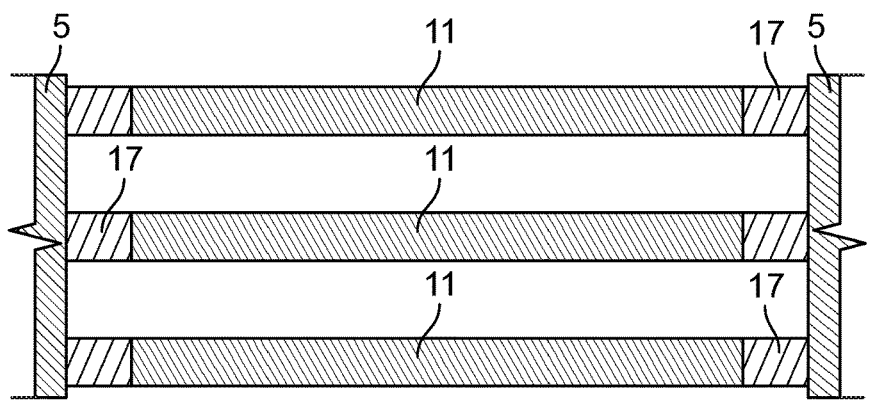
FIG. 7 is a sectional plan view of the stripped multi-core conductor with beads.

FIG. 7 shows a plan view of the conductor 1 from FIG. 6 once a bead 11 has been formed in each core 17. This may take place by analogy with the process described in FIGS. 3 and 4 by the molding tool 8, for example by drop forging.

Figure 8:
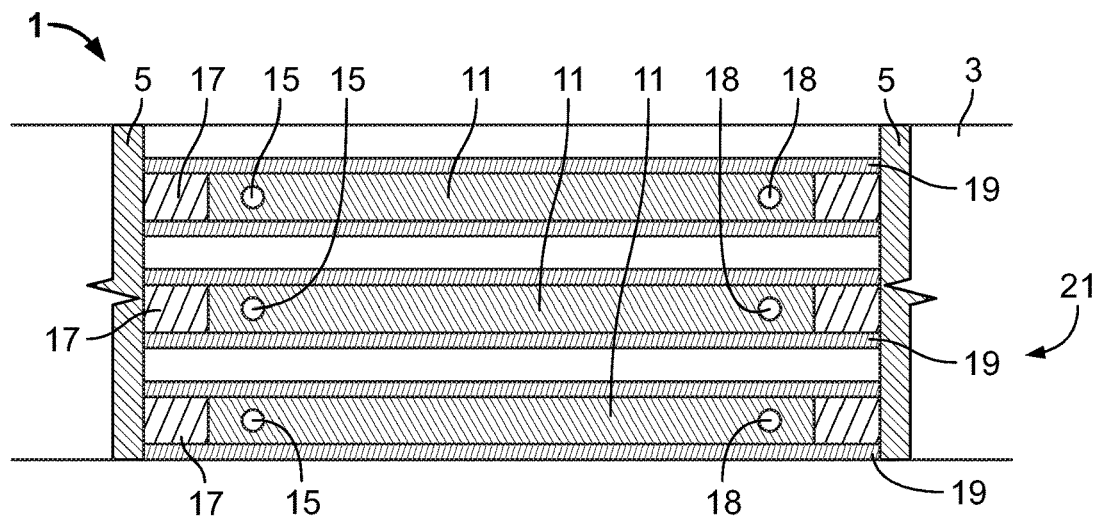
FIG. 8 is a sectional plan view of the stripped multi-core conductor after welding.

FIG. 8 shows the conductor 1 from FIG. 7 after it has been placed onto a workpiece 3, in a plan view. By the holding-down devices, the conductor 1 can be held down on the workpiece 3 in a way analogous to FIG. 5. The workpiece 3 in this case comprises three conducting regions 19, each core 17 being assigned a conducting region 19. On account of the beads 11 of the cores 17, it may be provided, by analogy with FIG. 5, that the cores 17 lie in contact with the conducting regions 19. Each core 17 comprises a first welding region 15, at which the conductor 1 or the core 17 of the conductor 1 is welded to the workpiece 3 or the conducting region 19 of the workpiece 3 in a way analogous to FIG. 5 by laser radiation 16. Furthermore, the cores 17 respectively comprise a second welding region 18, which is likewise arranged in the region of the bead 11 in the stripped region 7 and at which the cores 17 can likewise be welded to the conducting regions 19. It is analogously also conceivable to weld the conductor 1 from FIG. 5 additionally to the workpiece 3 in the second welding region 18.

The conductor 1 and the workpiece 3 in this case again form an arrangement 21 of a conductor 1 on a workpiece 3, as shown in FIG. 8, in which the conductor 1 is welded to the workpiece 3. In particular, each core 17 of the conductor 1 is welded to a conducting region 19 of the workpiece 3. If the conducting regions 19 of the workpiece 3 are insulated with respect to one another, various contactings, for example of a battery, can thus be provided.

Figure 9:
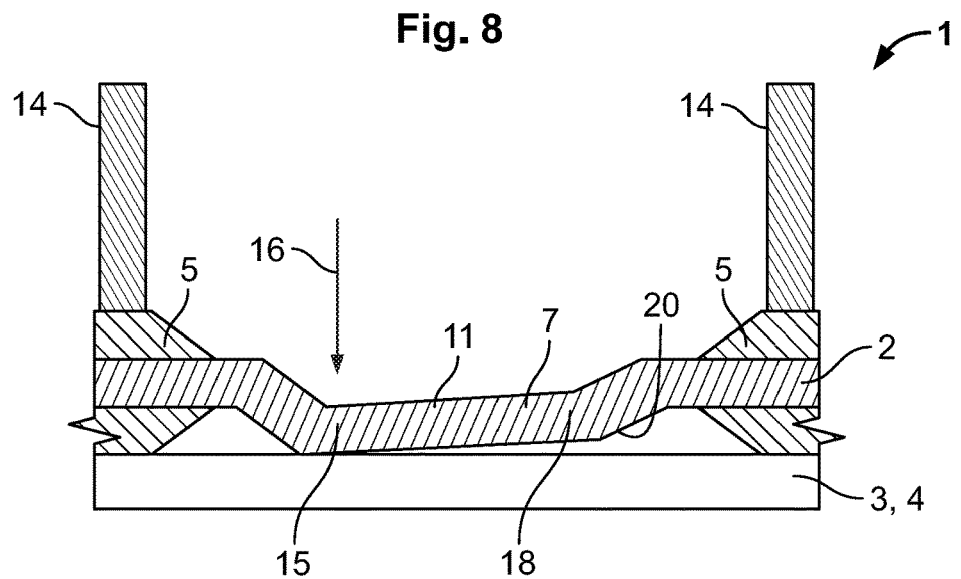
FIG. 9 is a sectional side view of a conductor held down by a pair of holding-down devices.

FIG. 9 shows a cross section through a further conductor 1 held down on a workpiece 3 by the holding-down devices 14. By contrast with FIG. 5, the conductor 1 in FIG. 9 is held down by the holding-down devices 14 in the region of the insulation 5, that is to say outside the stripped region 7 or the bead 11. This is possible in particular whenever the depth 12 of the bead 11 coincides with the thickness 13 of the insulation 5, as already described, since mechanical contact between the first metal 2 of the conductor 1 and the second metal 4 of the workpiece 3 is nevertheless possible. Thus, the first metal 2 of the conductor 1 can be welded in the welding region 15 to the second metal 4 of the workpiece 3 by laser radiation 16. If a number of cores 17 are provided, as shown for example in FIGS. 6-8, each of the cores 17 may be welded by m this process to a corresponding conducting region 19 of the workpiece 3.

In a second welding region 18, as shown in FIG. 9, the bead 11 is configured in such a way that there is a distance 20 between the first metal 2 of the conductor 1 and the second metal 4 of the workpiece 3. If, during exposure to the laser radiation 16, the first metal 2 is heated on account of the laser radiation 16, the first metal 2 expands.

Figure 10:
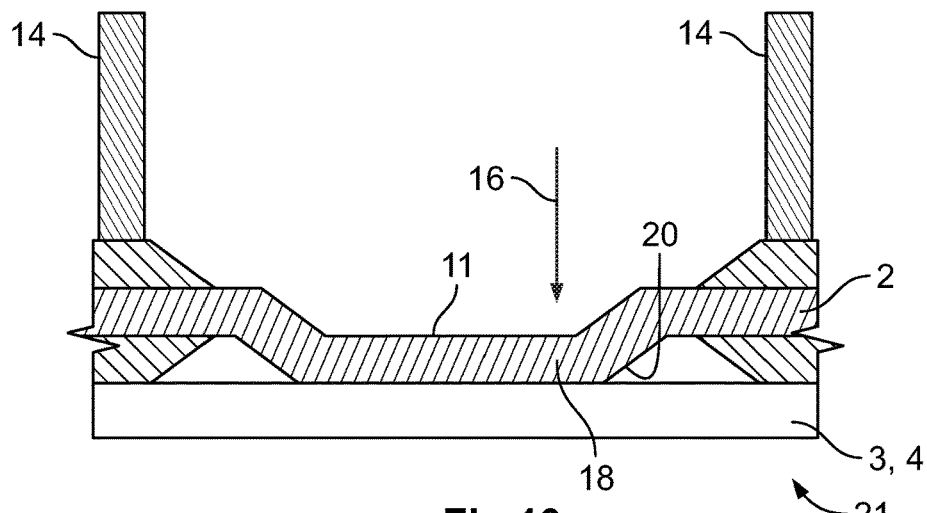
FIG. 10 is a sectional side view of the conductor of FIG. 9 during the welding operation.

FIG. 10 shows the conductor 1 and the workpiece 3 from FIG. 9 after the first metal 2 has been welded to the second metal 4 in the welding region 15 and the first metal 2 has expanded on account of the laser radiation 16 acting on it. The expansion has the effect that the first metal 2 of the conductor 1 then also lies in contact with the workpiece 3 in the further welding region 18 and can likewise be welded there to the workpiece 3 by laser radiation 16. The conductor 1 and the workpiece 3 once again form an arrangement 21 as already described above.

In an embodiment, the conductor 1 may be a flat conductor with a rectangular cross section. In particular, the cores 17 may be flat conductors with a rectangular cross section, whereby the contact of the conductor 1 or of the cores 17 lying on the workpiece 3 is improved.

In FIG. 5, the holding down of the conductor 1 by the holding-down devices 14 in the stripped region 7 of the bead 11 is shown. In FIGS. 9 and 10, the holding-down devices 14 are arranged in such a way that the holding down takes place on the insulation 5. It is also conceivable in combination that one of the holding-down devices 14 holds down the conductor 1 in the region of the bead 11 or the stripped region 7, while the other holding-down device 14 holds down the conductor 1 in the region of the insulation 5. Furthermore, it is alternatively likewise conceivable to provide fewer or more holding-down devices 14, for example only one holding-down device 14 or three or more holding-down devices 14. Instead of the holding-down devices 14, an air stream may also be used, by which the conductor 1 is pressed onto the workpiece 3.

In an embodiment, in the first welding region 15 or the second welding region 18, the first metal 2 may be welded together with the second metal 4 at a number of welding points, that is to say by respective multiple exposure to the laser radiation 16. The welding points may for example be arranged in the form of a cross or spiral. The laser radiation 16 may in this case be any laser radiation suitable for welding the first metal 2 and the second metal 4.

A cross section of the first metal 2 of the conductor 1, and also of the cores 17 of the conductor 1, may in this case be 1 millimeter on 0.2 millimeter. This means that, in the representation of FIGS. 1 to 5 or 9 and 10, a thickness of the first metal 2 of 0.2 millimeter is represented, and the cores 17 from FIGS. 6 to 8 are represented in their width of 1 millimeter. The thickness 13 of the insulation 5 may be between 0.1 and 0.5 millimeter, for example 0.3 millimeter. The depth 12 of the bead 11 may then likewise lie in this range and be for example 0.3 millimeter.

In an embodiment, the first metal 2 comprises copper or aluminum, is copper or aluminum or comprises a laser-weldable alloy of the stated metals. The second metal 4 may comprise aluminum or a laser-weldable alloy with aluminum.

In the welding process of the present invention, a distance between the conductor 1 and the workpiece 3 is reduced by bead 11, by the necessary deforming of the conductor 1 already taking place during the forming of the bead 11 and not only when the holding down takes place. The bead 11 may be configured in such a way that a convexity of the conductor 1 in the direction of the workpiece 3 is produced on account of the bead 11 and, as a result, the distance between the conductor 1 and the workpiece 3 is reduced. It may be provided that a further deformation of the conductor 1, occurring in addition to the bead 11, takes place during the holding down of the conductor 1. In particular, the welding process can be improved if a zero gap is produced, that is to say the conductor 1 lies in direct contact with the workpiece 3.

What is claimed is:

1. A process for welding a conductor onto a workpiece, comprising:
    providing the conductor including a first metal;
    providing the workpiece including a second metal;
    removing an insulation of the conductor over a predetermined length;
    forming a bead in a stripped region of the conductor;
    holding down the conductor on the workpiece to produce a mechanical contact in a welding region between the conductor and the workpiece, the welding region is arranged in a region of the bead;
    laser welding the conductor to the workpiece at the bead in the welding region; and
    after the laser welding in the welding region, laser welding the conductor to the workpiece at the bead in a further welding region, the conductor initially lies in contact with the welding region and not in contact with the further welding region when the bead is formed.

2. The process of claim 1, wherein the workpiece includes a plurality of conducting regions.

3. The process of claim 2, wherein the conductor is part of a multi-core conductor, the insulation is removed on each of a plurality of cores of the multi-core conductor.

4. The process of claim 3, wherein the bead is formed on each of the plurality of cores.

5. The process of claim 4, wherein each of the cores is held down and welded to one of the conducting regions.

6. The process of claim 1, wherein a thermal expansion of the conductor during the laser welding in the welding region deforms the conductor into contact with the further welding region.

7. The process of claim 1, wherein a depth of the bead is substantially equal to a thickness of the insulation.

8. The process of claim 1, wherein the conductor is a flat conductor with a rectangular cross section.

9. The process of claim 1, wherein the holding down occurs in the stripped region.

10. The process of claim 1, wherein the holding down occurs outside the stripped region.

11. The process of claim 1, wherein the laser welding in the welding region is performed at a plurality of welding points.

12. The process of claim 1, wherein the bead is formed by drop forging.

* * * * *